US012482985B2

(12) United States Patent
Riepe et al.

(10) Patent No.: US 12,482,985 B2
(45) Date of Patent: Nov. 25, 2025

(54) HIGH-CURRENT PLUG-IN CONNECTOR SYSTEM AND METHOD FOR SETTING ITS TOTAL DISCONNECTION FORCE

(71) Applicant: HARTING Electric Stiftung & Co. KG, Espelkamp (DE)

(72) Inventors: Dieter Riepe, Luebbecke (DE); Jan Andree Beneke, Vechta (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 0 days.

(21) Appl. No.: 19/216,020

(22) Filed: May 22, 2025

(65) Prior Publication Data

US 2025/0286315 A1 Sep. 11, 2025

Related U.S. Application Data

(63) Continuation of application No. PCT/DE2024/100014, filed on Jan. 9, 2024.

(30) Foreign Application Priority Data

Jan. 23, 2023 (DE) ..................... 10 2023 101 556.7

(51) Int. Cl.
*H01R 13/627* (2006.01)

(52) U.S. Cl.
CPC ..... *H01R 13/6278* (2013.01); *H01R 13/6273* (2013.01)

(58) Field of Classification Search
CPC ........................ H01R 13/6278; H01R 13/6273
USPC ................................ 439/345, 350, 357, 157
See application file for complete search history.

(56) References Cited

U.S. PATENT DOCUMENTS 3,004,170 A 10/1961 Greenspan
4,493,520 A * 1/1985 Davies ............... H01R 13/6276 439/350
4,545,632 A 10/1985 Maier et al.
4,597,620 A * 7/1986 Lindner ............. H01R 13/5219 439/352
4,707,043 A 11/1987 Reed
(Continued)

FOREIGN PATENT DOCUMENTS

CN 201629434 U 11/2010
CN 102306879 A 1/2012
(Continued)

OTHER PUBLICATIONS

Phoenix Contact GmbH & Co. KG, Cancellation proceedings against German utility model 20 2023 002 957, filed Jul. 2, 2025 in the German Patent and Trade Mark Office.
(Continued)

*Primary Examiner* — Gary F Paumen
(74) *Attorney, Agent, or Firm* — Smartpat PLC

(57) ABSTRACT

A plug-in connector and a mating plug-in connector of a plug-in connector system includes at least one latching pin and, respectively, at least one latching receptacle. The at least one latching pin and the at least one latching receptacle can be plug-connected to each another and, in the plug-connected state, can be disconnected from each other again with the application of an individual disconnection force and are jointly configured for generating a specified amount of a total disconnection force for the plug-in connector system.

20 Claims, 6 Drawing Sheets

(56) References Cited

U.S. PATENT DOCUMENTS

| | | | | |
|---|---|---|---|---|
| 5,176,533 | A * | 1/1993 | Sakurai .............. | H01R 13/6277 439/352 |
| 5,338,213 | A | 8/1994 | Oko | |
| 5,658,162 | A | 8/1997 | Harting et al. | |
| 5,997,320 | A | 12/1999 | DeMello | |
| 6,247,965 | B1 | 6/2001 | Cummings et al. | |
| 6,273,729 | B1 | 8/2001 | Kelly | |
| 6,390,848 | B1 | 5/2002 | Murakami et al. | |
| 6,398,579 | B1 * | 6/2002 | Banas ................ | H01R 13/6273 439/372 |
| 7,354,284 | B2 | 4/2008 | Aime et al. | |
| 7,481,675 | B2 | 1/2009 | Patterson et al. | |
| 7,651,376 | B2 | 1/2010 | Schreier | |
| 7,785,131 | B2 | 8/2010 | Ferderer et al. | |
| 7,938,674 | B2 | 5/2011 | Lindkamp et al. | |
| 8,169,113 | B2 | 5/2012 | Jia et al. | |
| 8,292,676 | B2 | 10/2012 | Schmidt et al. | |
| 8,662,921 | B2 | 3/2014 | Kataoka | |
| 8,668,530 | B2 | 3/2014 | Riepe et al. | |
| 8,900,018 | B2 | 12/2014 | Riepe et al. | |
| 8,915,749 | B2 * | 12/2014 | Ikeda ............... | H01R 13/62938 439/372 |
| 8,979,568 | B2 | 3/2015 | Herbrechtsmeier et al. | |
| 8,992,266 | B2 | 3/2015 | Schmidt et al. | |
| 9,608,374 | B2 | 3/2017 | Beischer et al. | |
| 9,692,161 | B2 | 6/2017 | Lindkamp et al. | |
| 9,799,984 | B2 | 10/2017 | Lueckemeier | |
| 9,847,608 | B2 | 12/2017 | Bruex et al. | |
| 9,923,307 | B2 | 3/2018 | Beischer et al. | |
| 10,283,900 | B2 | 5/2019 | Herbrechtsmeier et al. | |
| 10,418,773 | B2 | 9/2019 | Herbrechtsmeier | |
| 11,223,155 | B1 | 1/2022 | Marquez | |
| 11,387,591 | B2 | 7/2022 | Lötkemann et al. | |
| 2002/0049005 | A1 | 4/2002 | Leve | |
| 2005/0146855 | A1 | 7/2005 | Brehm et al. | |
| 2007/0155252 | A1 | 7/2007 | Ferderer | |
| 2008/0305664 | A1 | 12/2008 | Shishikura et al. | |
| 2010/0120276 | A1 | 5/2010 | White | |
| 2016/0093980 | A1 * | 3/2016 | Beischer ............ | H01R 13/6315 439/345 |
| 2021/0119372 | A1 | 4/2021 | Stremlau et al. | |
| 2021/0194167 | A1 * | 6/2021 | Thomas ................. | H01R 13/20 |
| 2021/0408739 | A1 | 12/2021 | Ivancic et al. | |
| 2022/0360008 | A1 | 11/2022 | Aboulkassem et al. | |
| 2023/0076634 | A1 | 3/2023 | Ni et al. | |

FOREIGN PATENT DOCUMENTS

| | | | |
|---|---|---|---|
| CN | 102437453 | A | 5/2012 |
| DE | 1465689 | A1 | 5/1969 |
| DE | 2855867 | A | 7/1980 |
| DE | 3602296 | A1 | 7/1987 |
| DE | 9400329 | U1 | 4/1994 |
| DE | 4400478 | C1 | 5/1995 |
| DE | 102017104123 | | 4/2018 |
| DE | 112018006768 | T5 | 9/2020 |
| DE | 102019111847 | A1 | 11/2020 |
| DE | 102019121975 | A1 | 2/2021 |
| DE | 202023002957 | U1 | 3/2025 |
| EP | 3211727 | A1 | 8/2017 |
| KR | 20210096006 | | 8/2021 |
| WO | 9629761 | A1 | 9/1996 |
| WO | 2024176096 | A1 | 8/2024 |

OTHER PUBLICATIONS

UL 1682 „Standard for Safety—Plugs, Receptacles, and Cable Connectors of the Pin and Sleeve Type, Feb. 15, 2017.

* cited by examiner

HIGH-CURRENT PLUG-IN CONNECTOR SYSTEM AND METHOD FOR SETTING ITS TOTAL DISCONNECTION FORCE

CROSS-REFERENCE TO RELATED APPLICATIONS

This application is a continuation of International Patent Application PCT/DE2024/100014, filed on Jan. 9, 2024, which claims the benefit of German Patent Application DE 10 2023 101 556.7, filed on Jan. 23, 2023.

TECHNICAL FIELD

The disclosure relates to a high-current plug-in connector system, and to a method for adjusting a total disconnection force for a high-current plug-in connector system.

BACKGROUND

The term "total disconnection force" is to be understood here and in the following as the force which is needed to disconnect a plug-in connector from a mating plug-in connector plug-connected thereto, both of which are constituent parts of the high-current plug-in connector system.

Such high-current plug-in connector systems can be used, for example, to transmit electrical energy. In particular, a total electric current with high total current value of at least up to 16 A (ampere), e.g. at least up to 20 A preferably at least up to 35 A, particularly preferably at least up to 70 A, in particular at least up to 125 A, for example, at least up to 300 A and in particular even at least 900 A can be transmitted via the high-current plug-in connector system, and thus both via the plug-in connector and via the mating plug-in connector.

Plug-in connector systems, consisting of a plug-in connector and a mating plug-in connector, are known in the prior art. The plug-in connector can be plug-connected to the mating plug-in connector and can be disconnected from the mating plug-in connector again with the application of a total disconnection force. In the prior art, the total disconnection force generally tends to result at random from frictional forces, such as the sum of the in particular friction-related plug-in and separation forces of the useful electric contacts, the friction of a seal on the plug-in connector housing, etc.

In practice, requirements have arisen that demand that certain plug-in connector systems should have a defined total disconnection force depending on their function. In particular, for safety reasons, high-current plug-in connector systems, which are provided for transmitting particularly high currents, should have a total disconnection force that is also particularly high.

A disadvantage of the prior art is that the strength of the total disconnection force in existing high-current plug-in connector systems cannot be readily adjusted.

The German Patent and Trade Mark Office searched the following prior art in the priority application for the present application: DE 10 2019 111 847 A1, DE 10 2019 121 975 A1, DE 11 2018 006 768 T5, DE 14 65 689 A and US 2021/0194167 A1.

SUMMARY

The present application discloses a high-current plug-in connector system and a method, by means of which it is possible to adjust—in particular individually—the total disconnection force for the high-current plug-in connector system to a specified value using the simplest means possible. Preferably, retrofitting existing high-current plug-in connector systems should be made as straightforward as possible. Particularly preferably, only as few new components as possible should be added or changed compared to pre-existing high-current plug-in connector systems. In particular, the so-called "modularity" of the high-current plug-in connector systems should be retained as far as possible, i.e. its components should for the most part already exist on the market and be usable with as many further commercially available components as possible, i.e. they should at least be able to be plug-connected and preferably also jointly assembled to form a plug-in connector system, in particular to form a high-current plug-in connector system.

A high-current plug-in connector system has a plug-in connector and a mating plug-in connector. The plug-in connector and the mating plug-in connector can be plug-connected to each other and disconnected from each other with application of a total disconnection force. The plug-in connector has multiple high-current plug-in contacts of the same type. The mating plug-in connector has multiple high-current mating plug-in contacts that can be plug-connected to the high-current plug-in contacts. In the plug-connected state, each of the high-current plug-in contacts is mechanically and electrically conductively connected to a respective one of the high-current mating plug-in contacts to form a respective high-current plug-in contact pair for the transmission of electrical energy.

In addition, the plug-in connector has at least one latching pin and the mating plug-in connector has at least one latching receptacle. Each of the latching pins forms a respective latching pair with one of the latching receptacles. The latching pin and the latching receptacle of each plug-in contact pair can be plug-connected to each other with the application of an individual plug-in force and, in the plug-connected state, can be disconnected from each other again with the application of an individual disconnection force. As a result, they are jointly configured for generating a specified amount of said total disconnection force, wherein the individual disconnection force of each latching pair is at least 1.5 times its said individual plug-in force.

In this context and throughout the following, it is clear to a person skilled in the art that the term "individual disconnection force" refers specifically to a single plug-in contact pair.

Preferably, the individual disconnection force can be at least 1.75 times the individual plug-in force.

In particular, the individual disconnection force can be at least twice that of the individual plug-in force.

For example, the individual disconnection force can be at least 2.5 times the individual plug-in force In one particularly preferred configuration, the individual disconnection force can even be at least three times, in particular even at least four times and particularly preferably even at least five times the individual plug-in force.

One advantage of the system is that it can make the retrofitting of existing high-current plug-in connector systems particularly straightforward. Ultimately, compared to pre-existing high-current plug-in connector systems, only one or optionally also multiple high-current plug-in contact pairs need to be replaced with one or more latching pairs, respectively.

It is particularly advantageous that the so-called "modularity" of the high-current plug-in connector system is retained as much as possible, i.e. all its components may already existed on the market and may be used with other components that are also commercially available; therefore, not only can they be plug-connected with other commercially available plug connectors, but they can preferably also be assembled jointly with other commercially available components to form another plug-in connector system/high-current plug-in connector system. The aforementioned solution therefore differs significantly in this regard from other conceivable solution approaches—which are also worse in this respect—in which, e.g., one or more plug-in connector housings, a locking system or other components would have to be modified in order to modify the total disconnection force.

One advantage of the disclosed system is that it is possible to individually adjust the total disconnection force for a high-current plug-in connector system to a specified value with very simple means. Ultimately, all that is required is for at least one of the high-current plug-in contacts of a commercially available high-current plug-in connector system to be replaced by a latching pin and one of the high-current mating plug-in contacts of the commercially available high-current plug-in connector system to be replaced by a latching receptacle. Replacing a plug-in contact is a routine task that is also frequently undertaken by the end customer and therefore only requires very little effort.

In one advantageous configuration, the latching pin and the latching receptacle can already be appropriately designed at the production stage to generate a certain individual disconnection force, so that the total disconnection force corresponds at least to the load capacity of the high-current plug-in connection system. This has the advantage that the adjustment can be made as early as during the production stage and the high-current plug-in connector system can be delivered to the end user with this adjustment already made.

In another advantageous configuration, the high-current plug-in connector system can additionally have an entire set of various latching pins and various latching receptacles, which in connection with one another generate different total disconnection forces. Therefore, one or more suitable latching pins and mating plug-in contact can be selected from this set and used in the plug-in connector and the mating plug-in connector, in order in particular to adjust the desired/specified total disconnection force in combination with one another. This has the advantage that the end user can individually adjust the total disconnection force to their respective application, e.g. the range of the actually transmitted current.

A method for adjusting the total disconnection force of a high-current plug-in connector system therefore provides that the specified total disconnection force is adjusted by selecting one or more suitable plug-in contacts and one or more suitable mating plug-in contacts from said set of various latching pins and various latching receptacles.

In one preferred configuration, the latching pin and the latching receptacle can be latched to one another in the plug-connected state, in order to generate the total disconnection force or at least a part thereof by means of the individual disconnection force that arises when they are unlatched from each other. Alternatively or in addition, frictional forces can also play a role here.

In a further preferred configuration, each high-current plug-in contact pair can be designed in the plug-connected state to transmit currents of at least 10 A ("ampere"), preferably at least 20 A, particularly preferably at least 40 A, in particular at least 60 A, for example, at least 70 A and in particular even at least 80 A.

The term "designed" in this case means that the respective high-current plug-in contact pair can be permanently loaded with currents "up to" the respectively specified maximum value, i.e. with current values which correspond to the respectively specified maximum value or are less than the respectively specified maximum value.

The person skilled in the art is well aware that the high current-carrying capacity, in particular at a specified voltage, is advantageous for the transmission of as much electrical energy as possible.

In a further preferable configuration, said individual disconnection force is at least 15 N ("Newton"), preferably at least 20 N, particularly preferably at least 25 N, in particular at least 60 N, for example at least 75 N, for example at least 85 N and preferably even 97 N and more, e.g. at least 100 N, and, if appropriate, even more than 110 N and more, i.e., for example, 120 N and even more.

Thus, specified disconnection forces may be, for example: 18 N; 22 N; 27 N; 67 N; 89 N; 111 N, 127 N.

While a plug-in connector manufacturer specifies and assigns the maximum current-carrying capacity, the total disconnection force can be adapted to the current actually transmitted by the entire high-current plug-in connector system when the end user ultimately installs it in place. This total current results from the sum of the current values of the individual currents which flow through the individual high-current plug-in contact pairs.

For example, the specified total disconnection force can be 18 N for actually used total current values of 15 A.

For example, the specified total disconnection force can be 22 N for an actually used total current value of 16 A to 20 A.

For example, the specified total disconnection force can be 27 N for an actually used total current value of 21 A to 35 A.

For example, the specified total disconnection force can be 67 N for an actually used total current value of 36 A to 70 A.

For example, the specified total disconnection force can be 89 N for an actually used total current value of 71 A to 125 A.

In one preferred embodiment, the plug-in connector has at least one contact carrier which is formed from an electrically insulating material. The contact carrier can be designed as an integral part of a one-piece plug-in insert ("monoblock"). However, the plug-in connector can also have multiple plug-in connector modules that are built into a plug-in connector modular frame so as to form a modular plug-in insert. In the latter case, each plug-in connector module has a contact carrier, meaning that the plug-in connector then has multiple contact carriers.

The plug-in connector has a respective contact chamber for each of said high-current plug-in contacts and also for each of said latching pins. The contact chambers are arranged in the contact carrier—or distributed on the multiple contact carriers and in the multiple contact carriers.

Furthermore, the mating plug-in connector has at least one mating contact carrier made from an electrically insulating material. The mating contact carrier can be designed as an integral part of a mating plug-in insert ("monoblock"). However, the mating plug-in connector can also have multiple further mating plug-in connector modules that are built in a mating plug-in connector modular frame in order to form a modular mating plug-in insert. In the latter case, each module has a mating contact carrier, meaning that the mating plug-in connector then has multiple mating contact carriers.

The mating high-current plug-in connector has a respective mating contact chamber for each of said high-current mating plug-in contacts and also for each of said latching receptacles. These mating contact chambers are arranged in the mating contact carrier—or distributed on the multiple mating contact carrier and in the mating contact carriers.

In one preferred configuration, the contact chambers of the plug-in connector are designed to be the same shape as each other. In a further advantageous configuration, the mating contact chambers of the mating plug-in connector are designed to be the same shape as each other.

This is beneficial to said modularity in terms of compatibility with further possible product components because the respective contact carrier/mating contact carrier can therefore optionally be equipped both with high-current contacts/high-current mating contacts and with latching pins/latching receptacles, in particular in all contact receptacles.

In one preferred configuration, the at least one contact carrier has a cable connection side and a plug-in side opposite the cable connection side. The contact chambers are designed as through-openings which connect the cable connection side to the plug-in side.

Furthermore, the at least one mating contact carrier can have a mating cable connection side and a mating plug-in side opposite the mating cable connection side. The mating contact chambers can likewise be designed as through-openings which connect the mating cable connection side to the mating plug-in side.

In this context, it should be mentioned at this point that the terms "plug-in side" and "cable connection side" and "plug-in direction" always relate to the associated plug-in connectors or mating plug-in connectors. The plug-in direction in the sense of a vectorial direction actually refers to the plug-in axis which is identical for the plug-in connector and the mating plug-in connector. The orientation always refers to the plugging-in direction, i.e. towards the respective other plug-in connector/mating plug-in connector. In the plug-connected state, the contact carrier and the mating contact carrier are arranged with their plug-in side and mating plug-in side facing towards each other and with their respective cable connection sides facing away from each other.

In a further preferred embodiment, said high-current plug-in contacts and said latching pin(s) are arranged in each case in one of the contact chambers of the plug-in connector and held therein. Said high-current mating plug-in contacts and said latching receptacle(s) are arranged in each case in one of the mating contact chambers of the mating plug-in connector and held therein.

This has the advantage that the latching pins—although they differ from the high-current plug-in contacts—can be accommodated in contact receptacles of the same shape, which benefits said modularity. For example, a conventional contact carrier can be used. All that is required is to insert a latching pin—or the desired number of latching pins—into its contact chamber which was originally provided for receiving the high-current plug-in contacts. The same also goes, of course, for the mating contact carrier and the latching receptacles.

Both the high-current plug-in contacts and the high-current mating plug-in contacts can consist of one or more electrically conductive material(s), in particular metal, i.e. optionally of one or more metals, and each have a cable-connection-side cable connection region and a plug-in-side high-current plug-in region for the mutual mechanical and electrically conductive plug-in connection.

The latching pins and/or the latching receptacles can also consist of one or more electrically conductive material(s), in particular metal(s), but alternatively—depending on shape and required elasticity—also of one or more electrically non-conductive material(s), for example of plastic and optionally of multiple different plastic(s).

Preferably, the latching pins and latching receptacles are in each case designed as an integral part, in particular as a single part. However, multi-part, in particular multi-piece embodiments are also conceivable.

In one preferred configuration, the latching pins and/or the latching receptacles each have a plug-in-side plug-in region for mutual mechanical plug-in connection, but no cable-connection-side cable connection region. This has the advantage that they are less complicated to manufacture. Furthermore, this has the advantage that they are particularly stable in relation to their size.

In one preferred configuration, the plug-in region of the latching pins can be designed as a male contact and the plug-in region of the latching receptacles can be designed as a female contact. In particular, the respective female contact of the at least one latching receptacle has multiple slits, thereby forming fins in the plug-in region that point in the plug-in direction.

In a further preferred embodiment, the male contact of the plug-in contact can have a circumferential groove.

The circumferential groove of the male contact can furthermore have a holding surface on its plug-in side. Preferably, this holding surface can be aligned substantially perpendicular, i.e. at an angle of between 80° and 120°, in particular at an angle of between 85° and 95° or between 95° and 105° and ideally at a right angle of 90° or at an angle of 100° to the plug-in direction, in which the male contact naturally points. These values have proven to be particularly suitable in experiments, but of course other angles can also be useful under other boundary conditions.

Furthermore, said fins, pointing in the plug-in direction, of the mating plug-in contact, at their plug-in-side ends, can have radially inwardly directed latching hooks which, in the plug-connected state, engage in the circumferential groove of the plug-in contact.

The latching hooks can each have a sliding slope and a latching surface, wherein the latching surface is at an angle of between 30° and 90°, preferably between 40° and 50° or between 55° and 65°, particularly preferably between 42.5° and 47.5° or 57.5° and 62.5°, i.e., for example, at an angle of approximately 45° or 60° to the plug-in direction.

A method serves for adjusting the total disconnection force of a high-current plug-in connector system. In this method, the specified total disconnection force is adjusted at least by dimensioning the following parameters:

- the number of latching pins/latching receptacles;
- the material of the fins;
- the thickness of the fins;
- the length of the fins;
- the angle of the latching surface of the latching hook of the fins to the plug-in direction;
- the angle of the plug-in-side holding surface of the circumferential groove of the male contact to the plug-in direction.

Alternatively or additionally, the specified total disconnection force can also be adjusted by selecting one or more suitable latching pins and one or more suitable latching receptacles from said set of various latching pins and various latching receptacles.

BRIEF DESCRIPTION OF THE DRAWINGS

An exemplary embodiment of the invention is illustrated in the drawings and will be explained in more detail in the following.

DETAILED DESCRIPTION

Figure 1A:
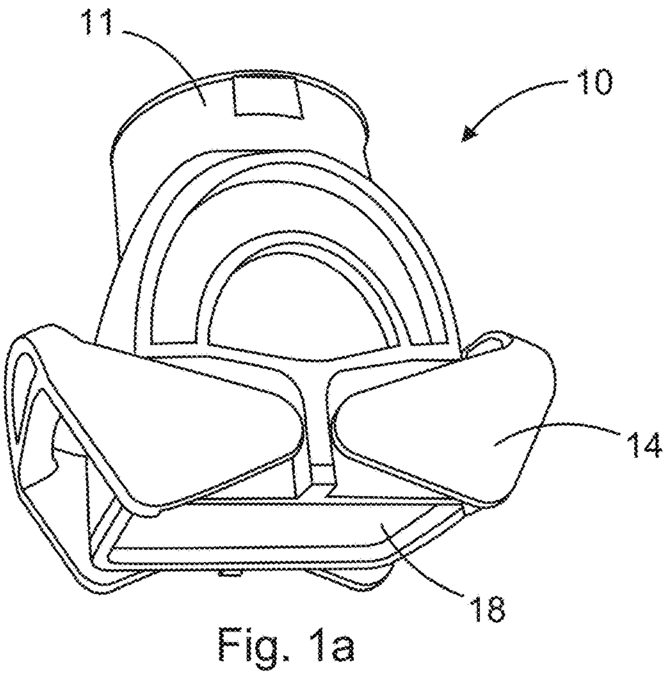
FIG. 1*a* shows a plug-in connector housing.

The figures contain partially simplified, schematic illustrations. Sometimes identical reference numerals are used for the same but possibly not identical elements. Different views of the same elements could have different scales. Direction information, for example, "left," "right," "top," and "bottom" is to be understood with reference to the respective figure and may vary in the individual illustrations with respect to the object shown.

FIG. 1*a* shows a plug-in connector housing 10 of a plug-in connector 1, which in turn is a constituent part of a high-current plug-in connector system shown in the following (see FIG. 5*a*, *b* and FIG. 6*a*, *b*). The plug-in connector housing 10, which is a grommet housing, is not compulsory for the function of the high-current plug-in connector system but, in the embodiment shown here, it is a useful, optional protective safety component of the plug-in connector 1 and thus also of the high-current plug-in connector system. The plug-in connector housing 10 consists of plastic and has a cable outlet with a cable exit 11 on one side and a rectangular plug-in opening 18 on the other side, into which a plug-in insert 12, shown hereinbelow, can be inserted and latched. In addition, the plug-in connector housing 10 has one locking clip 14 on each of its opposite narrow sides for locking with a mating plug-in connector housing 20, which is shown later.

Figure 1B:
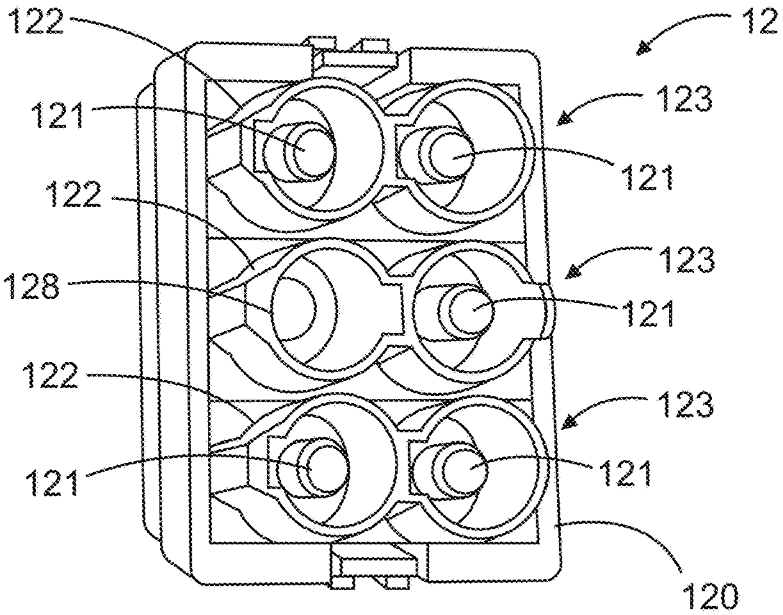
FIG. 1*b* shows an equipped module frame.

FIG. 1*b* shows the aforementioned plug-in insert 12. This plug-in insert 12 is designed as a modular frame 120 equipped with plug-in connector modules 123. It is thus a modular plug-in insert 12. In the present embodiment, three plug-in connector modules 123 are provided, but of course any other number of plug-in connector modules 123 could be provided in another embodiment.

Each of the plug-in connector modules 123 has a contact carrier 122, each with two contact chambers 128. However, only one of these contact chambers 128 can be seen in the drawing because the others are equipped with high-current plug-in contacts 121. Lastly, the two outer contact carriers 122 are fully equipped, i.e. in this case with two high-current plug-in contacts 121. The middle contact carrier 122 is partially equipped, namely with a high-current plug-in contact 121, while the last contact chamber 128 has been left free for now for receiving a latching pin 100. Of course, each of the contact carriers 122 could also have a different number of contact chambers 128. The contact chambers 128 of the contact carriers 122 are designed to be the same shape as each other.

Figure 1C:
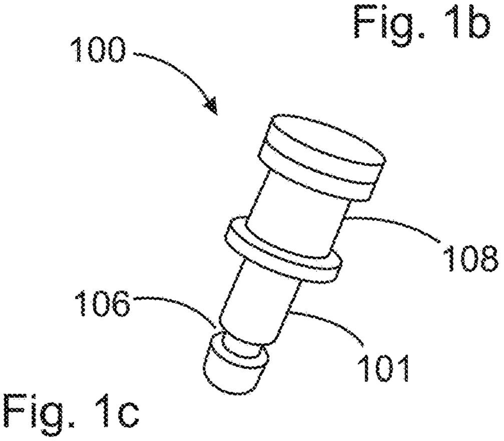
FIG. 1*c*, *d* show a latching pin.
Figure 1D:
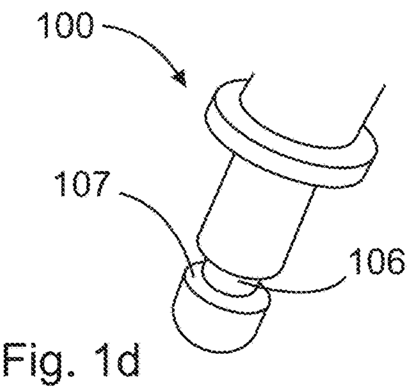

FIGS. 1*c* and 1*d* show the aforementioned latching pin 100, which is provided for insertion into the last still unequipped contact chamber 128. This can be received in the contact chamber 128 and held therein by the contact carrier 122, but differs from the aforementioned high-current plug-in contacts 121 in particular in that, although it has a holding region 108, the latter has a solid design, so that the latching pin 100 has no cable connection region.

The latching pin 100 also has a plug-in region designed as a male contact 101. The male contact 101 has a circumferential groove 106 with a plug-in-side holding surface 107, which can be seen particularly clearly in the enlarged illustration in FIG. 1*d* and is labelled therein.

Figure 2A:
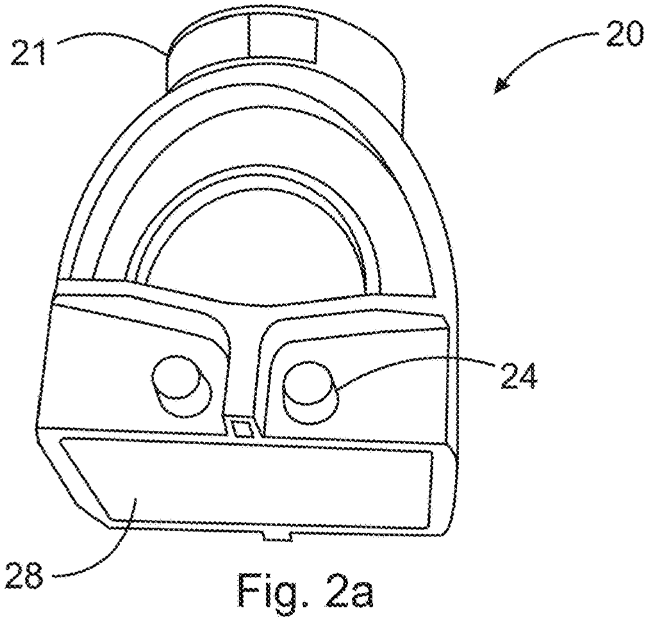
FIG. 2*a* shows a mating plug-in connector housing.

FIG. 2*a* shows a mating plug-in connector housing 20 of a mating plug-in connector 2, which together with the aforementioned plug-in connector 1 is a constituent part of said high-current plug-in connector system. Although the mating plug-in connector housing 20, which is a grommet housing, is not compulsory for the function of the high-current plug-in connector system, in the embodiment shown here, it is a useful, optional protective safety component of the mating plug-in connector 2 and thus of the high-current plug-in connector system. The mating plug-in connector housing 20 consists of plastic, has a cable outlet with a cable exit 21 on one side and a rectangular plug-in opening 28 on the other side, into which a mating plug-in insert 22, shown hereinbelow, can be inserted and can be latched. In addition, the mating plug-in connector housing 20 has two locking pins 24 on each of its two long sides for locking with the two locking clips 14 of the plug-in connector housing 10.

Figure 2B:
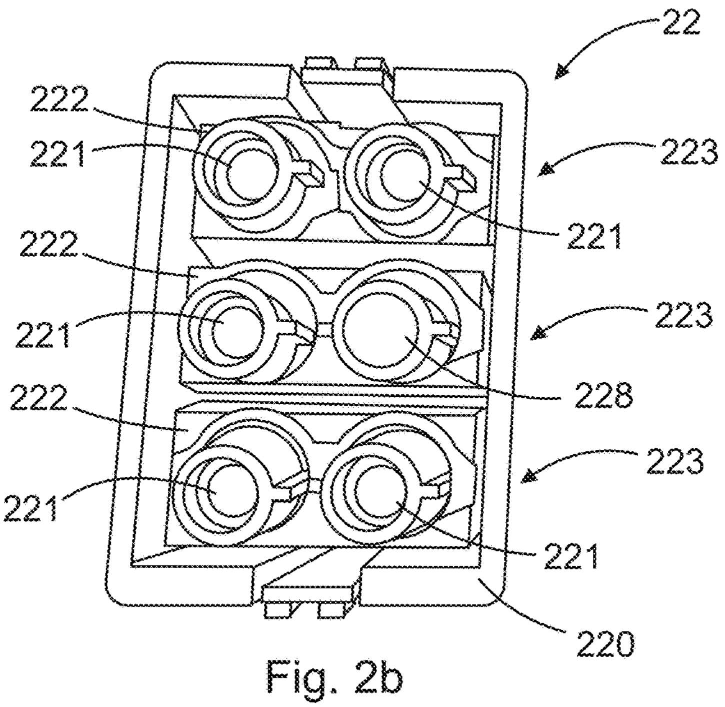
FIG. 2*b* shows an equipped mating module frame.

FIG. 2*b* shows the aforementioned mating plug-in insert 22. This mating plug-in insert 22 is designed as a modular frame 220 equipped with mating plug-in connector modules 223. Thus, it is a modular mating plug-in insert 22. In the present embodiment, three mating plug-in connector modules 223 are provided, but of course, any other number of mating plug-in connector modules 223 could also be provided in another embodiment.

Each of the mating plug-in connector modules 223 has a mating contact carrier 222, each with two mating contact chambers 228. However, only one of these mating contact chambers 228 can be seen in the drawing because the others are equipped with high-current mating plug-in contacts 221. Lastly, the two outer mating contact carriers 222 are fully equipped, i.e. in this case with two high-current mating plug-in contacts 221. The middle mating contact carrier 222 is only partially equipped, namely with a high-current mating plug-in contact 221, while the last mating contact chamber 228 has been left free for now for receiving a latching receptacle 200. Of course, each of the mating contact carriers 222 could also have a different number of mating contact chambers 228. The mating contact chambers 228 of the mating contact carriers 222 are designed to be the same shape as each other.

Figure 2C:
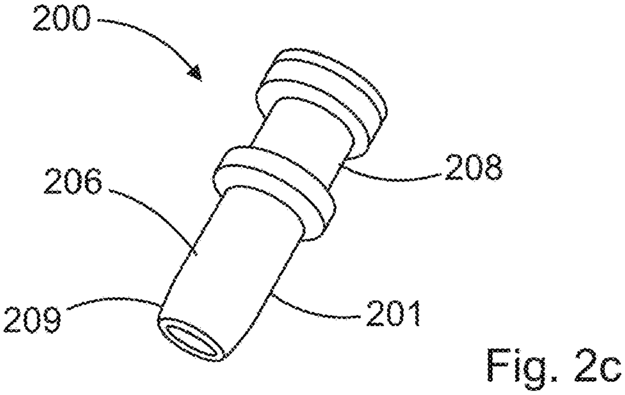
FIG. 2*c* shows a latching receptacle.

FIG. 2*c* shows the aforementioned latching receptacle 200, which is provided for insertion into the still unequipped mating contact chamber 228. This can be received in the mating contact chamber 228 and held therein by the mating contact carrier 222, but differs from the aforementioned high-current mating plug-in contacts 221 in particular in that, although it has a holding region 208, the latter has a solid design, so that the latching receptacle 200 has no cable connection region.

The latching receptacle 200 also has a plug-in region designed as a female contact 201. The female contact 201 has multiple slits 206, through which fins 209 with end-side, inwardly directed latching hooks 207 (as seen in FIG. 3*b*) are provided.

Figure 3A:
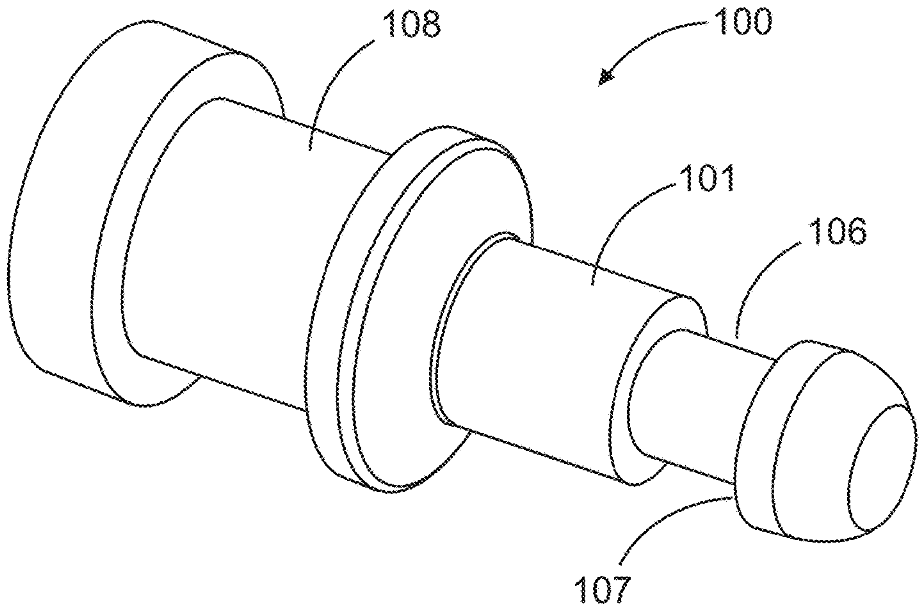
FIG. 3*a* shows the latching pin on an enlarged scale.

FIG. 3*a* shows the latching pin 100 on an enlarged scale. The holding surface 107 of the circumferential groove 106 is hidden in this view.

Figure 3B:
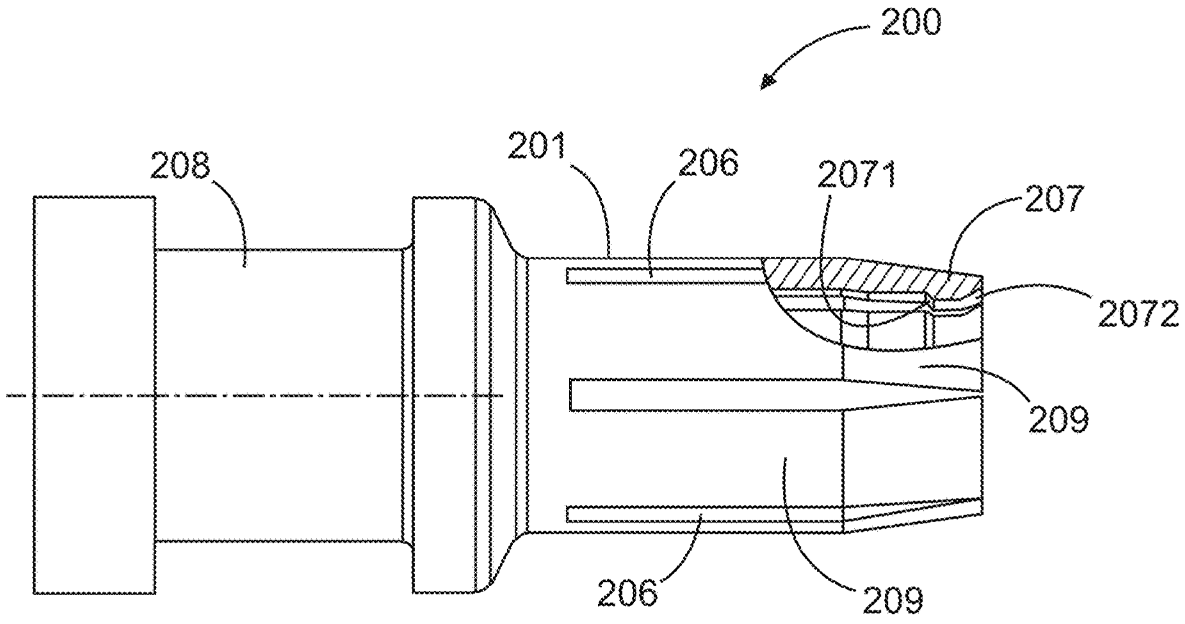
FIG. 3*b* shows the latching receptacle on an enlarged scale.

FIG. 3*b* shows the latching receptacle 200 on an enlarged scale. The latching hook 207 with a sliding slope 2072 and a latching surface 2071 inclined towards the plug-in direction can clearly be seen through a segment-like cut-out section at the top right in the drawing.

From FIGS. 3*a* and 3*b* it is thus clearly apparent for the person skilled in the art that the individual disconnection force is significantly higher than the individual plug-in force. Lastly, during the plug-connection, the sliding curvature (not referenced) of the latching pin, as shown on the right in FIG. 3*a*, slides along the sliding slopes 2072 of the latching receptacle 200 and bends its fins 209 apart over a part of the plug-in path corresponding to the shape of the curvatures.

By contrast, that part of the withdrawal path, at which the holding surface 107 of the latching pin 100 pushes the fins 209 of the latching receptacle 200 apart over its respective latching surfaces 2071 during the withdrawal from the latching receptacle 200, is significantly shorter. However, according to the principle of conservation of energy, the latching pin must apply at least the same mechanical energy over this short distance. Therefore—apart from frictional forces that reinforce this effect—the individual disconnection force is already substantially higher than the aforementioned individual plug-in force, because the individual plug-in force ultimately has a significantly larger distance to cover in order to apply the same mechanical tensioning energy to the fins.

Figure 4:
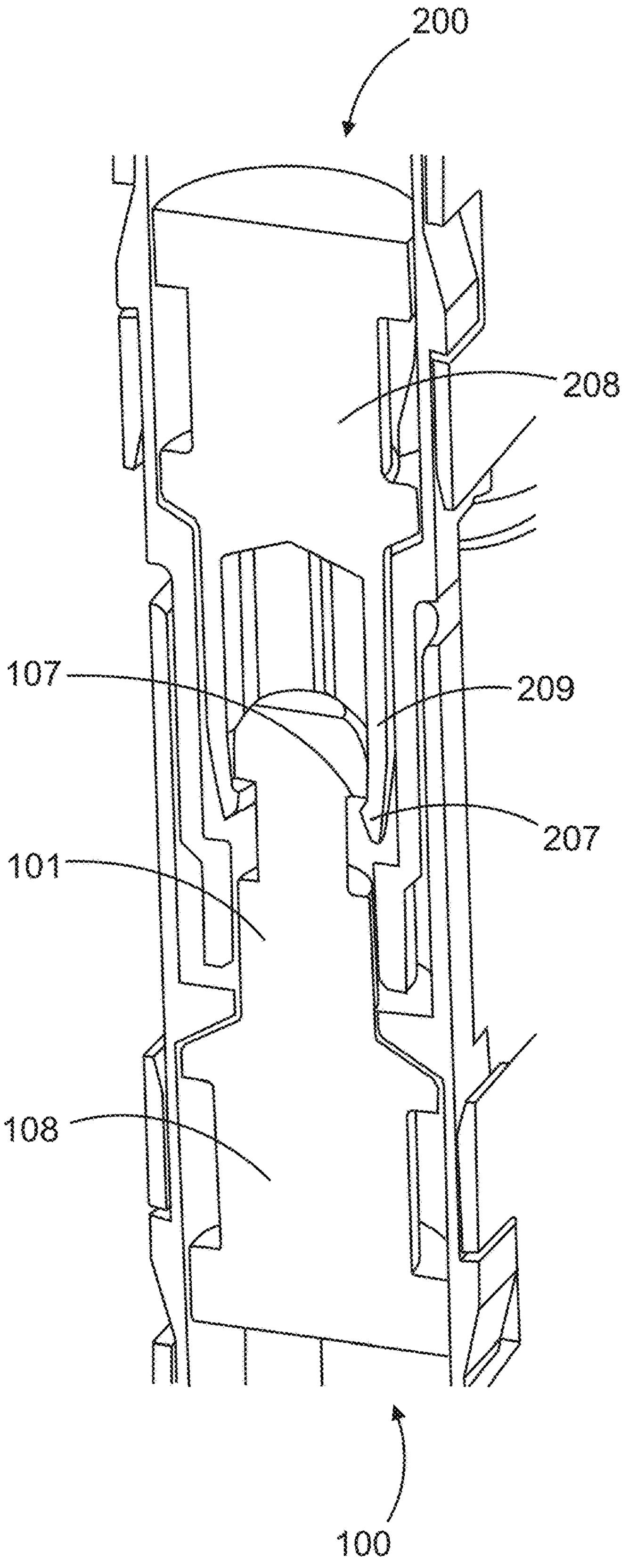
FIG. 4 shows the latching pin and the latching receptacle in the plug-connected state in a sectional illustration.

FIG. 4 shows the latching pin 100 and the latching receptacle 200 in the plug-connected state in a sectional illustration. It is readily apparent that the latching hooks 207, with their latching surfaces 2071 inclined counter to the plug-in direction, engage behind the holding surface 107 of the groove 106 (not labelled here). Therefore, for the disconnection, a corresponding individual disconnection force would have to be applied.

FIGS. 5*a* and 5*b* and 6*a* and 6*b* show a plug-connected high-current plug-in connector system, having the plug-in connector 1 and the mating plug-in connector 2 in two different sectional illustrations in each case with and without a high-current plug-in contact pair, consisting of the high-current plug-in contact 121 and the high-current mating plug-in contact 221.

Figure 5A:
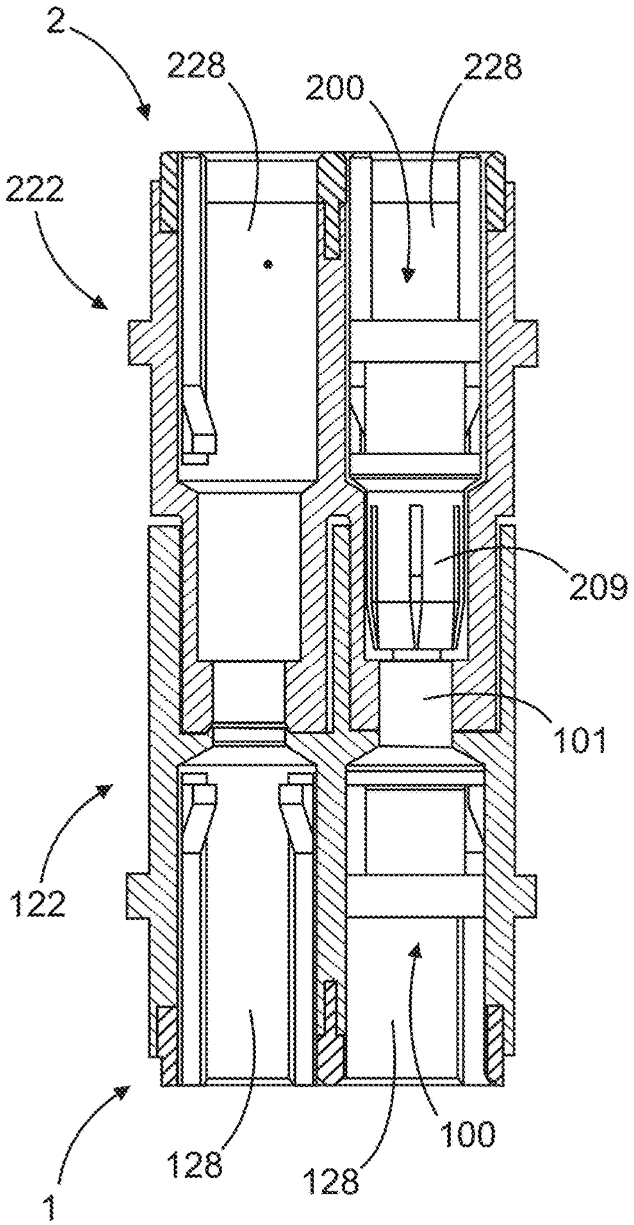
FIG. 5*a*, *b* show a plug-connected high-current plug-in connector system without and with a high-current plug-in contact pair in a first sectional illustration.
Figure 5B:
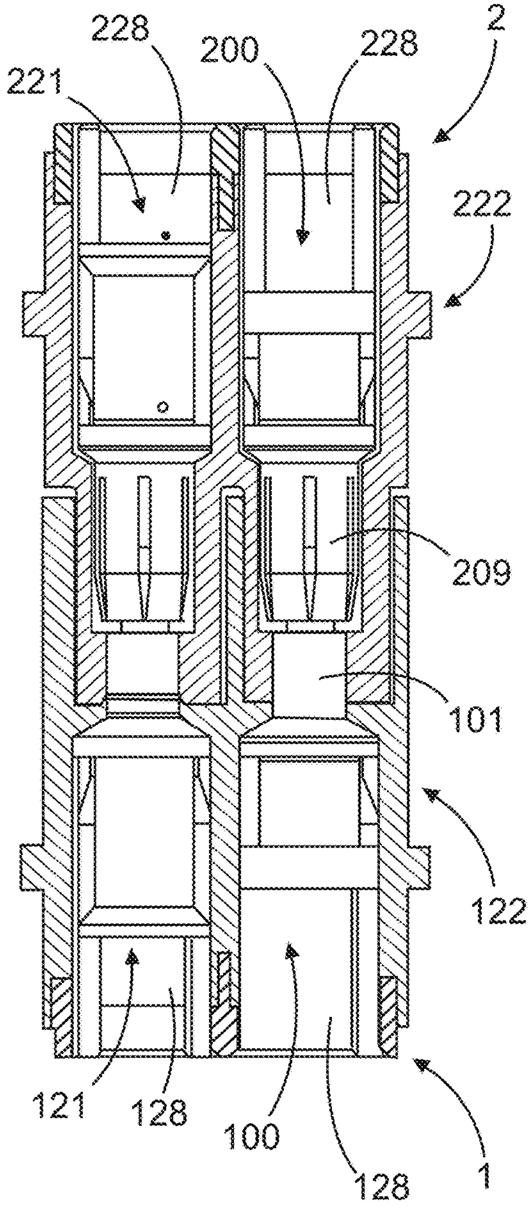
Figure 6A:
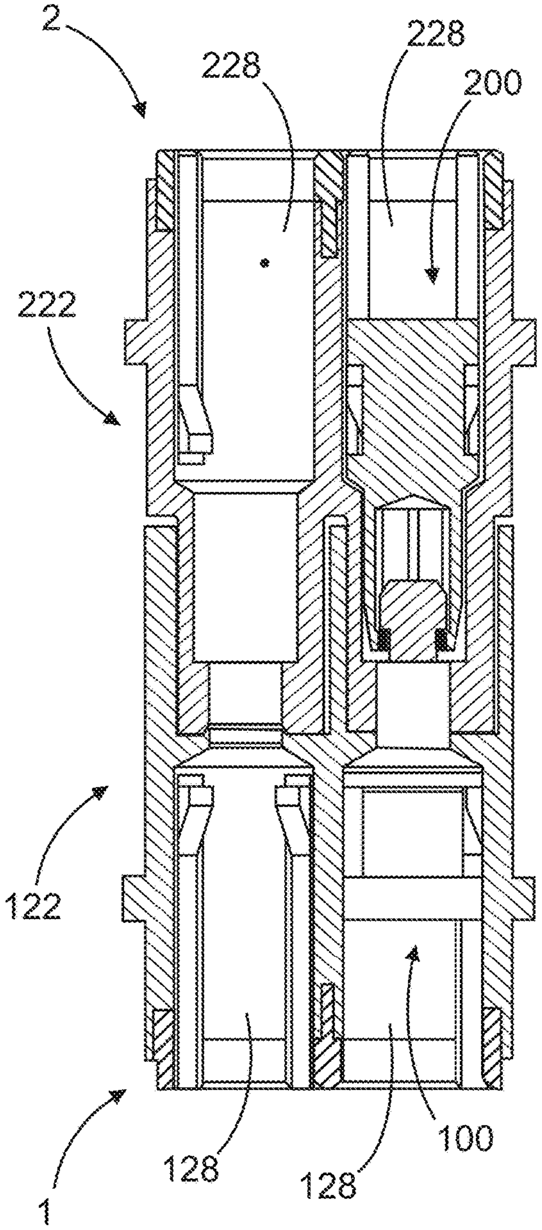
FIG. 6*a*, *b* shows the plug-connected high-current plug-in connector system with and without a high-current plug-in contact pair in a second sectional illustration.
Figure 6B:
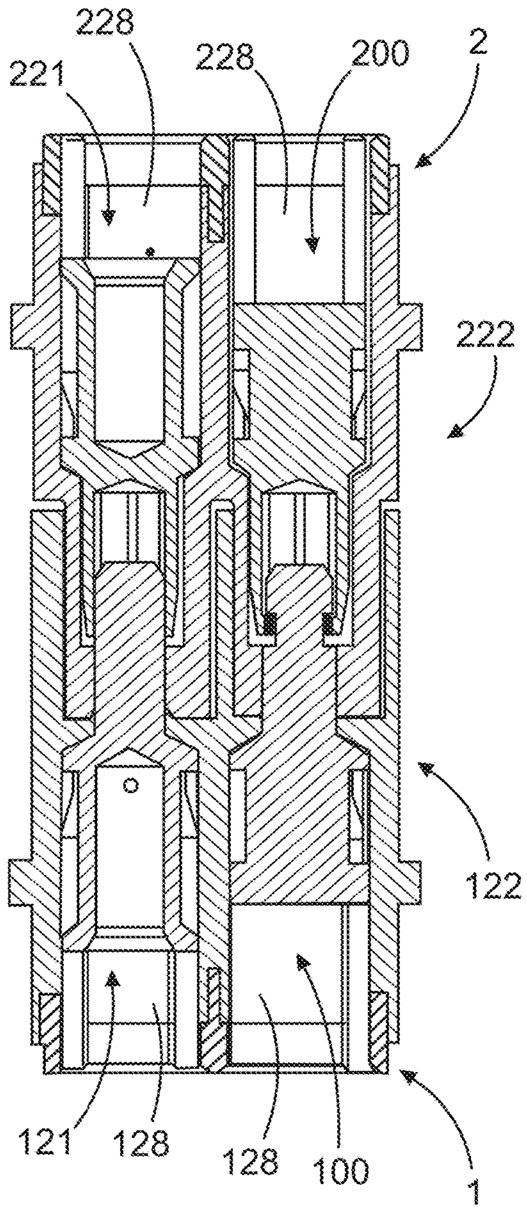

It can be seen particularly well in FIGS. 5*a* and 5*b* how the fins 209 of the latching receptacle 200 engage around the male contact 101 of the latching pin 100 in the region of its groove 106 on all sides. It can be seen particularly well in FIGS. 6*a* and 6*b* how the latching hooks 207 of the fins 209 engage in the groove 106.

Furthermore, it can clearly be seen that the contact chambers 128 are designed to be of similar type, irrespective of whether a high-current plug-in contact 121 or a latching pin 100 is inserted therein. Similarly, it can be seen that the mating contact chambers 228 are designed to be of similar type, irrespective of whether a high-current mating plug-in contact 221 or a latching receptacle 200 is inserted therein.

LIST OF REFERENCE NUMERALS

1 plug-in connector
10 plug-in connector housing
11 cable exit
12 plug-in insert
18 plug-in opening

121 high-current plug-in contacts
122 contact carrier
123 plug-in connector modules
128 contact chambers
100 latching pin
101 plug-in region, male contact
106 groove
107 holding surface
108 holding region
2 mating plug-in connector
20 mating plug-in connector housing
21 cable exit
22 mating plug-in insert
28 plug-in opening
221 high-current mating plug-in contacts
222 mating contact carrier
223 mating plug-in connector modules
228 mating contact chambers
200 latching receptacle
201 plug-in region, female contact
206 slits
207 latching hooks
2071 latching surface
2072 sliding slope
208 holding region
209 fins

What is claimed is:

1. A high-current plug-in connector system for facilitating an increased total disconnection force in a plug-connected state, the system comprising:

a plug-in connector with a plug-in insert, the plug-in insert having therein a plurality of contact chambers, and a latching pin in one of the plurality of contact chambers,
 the latching pin having a plug-in region comprising a holding surface, the holding surface being at an angle between 85° and 95° to a plug-in direction of the plug-in connector,
 wherein the latching pin is made of electrically non-conductive material; and a mating plug-in connector with a mating plug-in insert, the mating plug-in insert having a plurality of mating contact chambers, and a latching receptacle in one of the plurality of mating contact chambers,
 the latching receptacle comprising a plurality of fins that point in a plug-in direction of the mating plug-in connector,
 each of the plurality of fins having a radially inwardly directed latching hook, the latching hook having a sliding slope inclined toward the plug-in direction of the mating plug-in connector, and a latching surface inclined counter to the plug-in direction of the mating plug-in connector,
 wherein the latching receptacle is made of electrically non-conductive material; and wherein the latching surface of the latching hook is adapted to engage with the holding surface of the plug-in region of the latching pin in the plug-connected state.

2. The high-current plug-in connector system of claim 1, wherein the plug-in insert has six contact chambers, and wherein the mating plug-in insert has six mating contact chambers.

3. The high-current plug-in connector system of claim 1, wherein the latching pin and the latching receptacle are made of plastic.

4. The high-current plug-in connector system of claim 1, wherein the holding surface is aligned at an angle of 90° to the plug-in direction of the plug-in connector.

5. The high-current plug-in connector system of claim 1, further comprising:

a plug-in connector housing having a plug-in opening for receiving the plug-in insert; and a plurality of plug-in contacts for arrangement in the plurality of contact chambers.

6. The high-current plug-in connector system of claim 5, wherein the plug-in connector housing has a cable exit opening, and one or more locking clips.

7. The high-current plug-in connector system of claim 1, further comprising:

a mating plug-in connector housing having a plug-in opening for receiving the mating plug-in insert; and a plurality of mating plug-in contacts for arrangement in the plurality of mating contact chambers.

8. The high-current plug-in connector system of claim 7, wherein the plug-in connector housing has a cable exit opening, and one or more locking pins.

9. The high-current plug-in connector system of claim 1, wherein during a plug-connection between the plug-in insert and the mating plug-in insert, the latching pin engages with the sliding slope of the latching hook of the latching receptacle and bends the plurality of fins apart.

10. A high-current plug-in connector for facilitating an increased total disconnection force in a plug-connected state, comprising a plug-in insert, the plug-in insert comprising:

a plurality of contact chambers, and a latching pin in one of the plurality of contact chambers, wherein the latching pin has a plug-in region comprising a holding surface, the holding surface being at an angle between 85° and 95° to a plug-in direction of the high-current plug-in connector, wherein the latching pin is made of electrically non-conductive material; and wherein the holding surface of the plug-in region of the latching pin is adapted to engage with a latching surface of a latching hook on a corresponding mating plug-in insert in the plug-connected state.

11. The high-current plug-in connector of claim 10, wherein the plug-in insert has six contact chambers.

12. The high-current plug-in connector of claim 10, wherein the latching pin is made of plastic.

13. The high-current plug-in connector of claim 10, wherein the holding surface is aligned at an angle of 90° to the plug-in direction of the high-current plug-in connector.

14. The high-current plug-in connector of claim 10, further comprising:

a plug-in connector housing having a plug-in opening for receiving the plug-in insert; and a plurality of plug-in contacts for arrangement in the plurality of contact chambers.

15. The high-current plug-in connector of claim 14, wherein the plug-in connector housing has a cable exit opening, and one or more locking clips.

16. A high-current mating plug-in connector for facilitating an increased total disconnection force in a plug-connected state, comprising:

a mating plug-in insert, the mating plug-in insert having a plurality of mating contact chambers, and a latching receptacle in one of the plurality of mating contact chambers, the latching receptacle comprising a plurality of fins that point in a plug-in direction of the high-current mating plug-in connector, each of the plurality of fins having a radially inwardly directed latching hook, the latching hook having a sliding slope inclined toward the plug-in direction of the high-current mating plug-in connector, and a latching surface inclined counter to the plug-in direction of the high-current mating plug-in connector, wherein the latching receptacle is made of electrically non-conductive material; and wherein the latching surface of the latching hook is adapted to engage with a holding surface of a plug-in region of a latching pin in the plug-connected state.

17. The high-current mating plug-in connector of claim 16, wherein the mating plug-in insert has six mating contact chambers.

18. The high-current mating plug-in connector of claim 16, wherein the latching receptacle is made of plastic.

19. The high-current mating plug-in connector of claim 16, further comprising:

a mating plug-in connector housing having a plug-in opening for receiving the mating plug-in insert; and a plurality of mating plug-in contacts for arrangement in the plurality of mating contact chambers.

20. The high-current mating plug-in connector of claim 19, wherein the plug-in connector housing has a cable exit opening, and one or more locking pins.

* * * * *